(12) United States Patent
Starobin

(10) Patent No.: US 9,185,374 B2
(45) Date of Patent: Nov. 10, 2015

(54) METHOD AND SYSTEM FOR PRODUCING FULL MOTION MEDIA TO DISPLAY ON A SPHERICAL SURFACE

(75) Inventor: Michael A. Starobin, Olney, MD (US)

(73) Assignee: HONEYWELL INTERNATIONAL INC., Morristown, NJ (US)

( * ) Notice: Subject to any disclaimer, the term of this patent is extended or adjusted under 35 U.S.C. 154(b) by 1843 days.

(21) Appl. No.: 11/925,407

(22) Filed: Oct. 26, 2007

(65) Prior Publication Data

US 2008/0100756 A1  May 1, 2008

Related U.S. Application Data

(60) Provisional application No. 60/854,856, filed on Oct. 26, 2006.

(51) Int. Cl.
*H04N 9/31* (2006.01)
*G09B 27/00* (2006.01)

(52) U.S. Cl.
CPC .............. *H04N 9/3185* (2013.01); *G09B 27/00* (2013.01); *H04N 9/3147* (2013.01)

(58) Field of Classification Search
CPC ....... G06T 15/005; G06T 19/00; G06T 11/60; G06T 2210/44
USPC ............... 345/418, 419, 619, 6, 1.1, 629, 647
See application file for complete search history.

(56) References Cited

U.S. PATENT DOCUMENTS

| | | | | |
|---|---|---|---|---|
| 3,586,432 A * | 6/1971 | Pentes, Jr. | | 353/74 |
| 6,201,516 B1 * | 3/2001 | Tanide et al. | | 345/7 |
| 6,795,113 B1 * | 9/2004 | Jackson et al. | | 348/207.1 |
| 6,937,210 B1 * | 8/2005 | MacDonald | | 345/1.1 |
| 7,436,411 B2 * | 10/2008 | Marshall et al. | | 345/587 |
| 7,872,647 B2 * | 1/2011 | Mayer et al. | | 345/420 |
| 2002/0105480 A1 * | 8/2002 | Lowry et al. | | 345/6 |
| 2005/0017924 A1 * | 1/2005 | Utt et al. | | 345/32 |
| 2009/0135178 A1 * | 5/2009 | Aihara et al. | | 345/419 |
| 2009/0189917 A1 * | 7/2009 | Benko et al. | | 345/647 |
| 2010/0091014 A1 * | 4/2010 | Shenkar et al. | | 345/419 |

OTHER PUBLICATIONS

Benko, H. et al., "Sphere: Multi-Touch Interactions on a Sperical Display", Oct. 19-22, 2008, p. 77-86.*

(Continued)

*Primary Examiner* — Chante Harrison
(74) *Attorney, Agent, or Firm* — Ingrassia Fisher & Lorenz, P.C.

(57) ABSTRACT

A method and system for producing full motion media for display on a spherical surface is described. The method may include selecting a subject of full motion media for display on a spherical surface. The method may the include capturing the selected subject as full motion media (e.g., full motion video) in a rectilinear domain. The method may then include processing the full motion media in the rectilinear domain for display on a spherical surface, such as by orienting the full motion media, adding rotation to the full motion media, processing edges of the full motion media, and/or distorting the full motion media in the rectilinear domain for instance. After processing the full motion media, the method may additionally include providing the processed full motion media to a spherical projection system, such as a Science on a Sphere system.

1 Claim, 3 Drawing Sheets

(56) References Cited

OTHER PUBLICATIONS

The Magic Planet by Global Imagination (http://www.globalimagination.com/), printed Dec. 14, 2007 and Dec. 19, 2007 (including background information and frequently asked questions).

Immersive Projection Design by Eluminati (http://www.elumenati.com/), printed Dec. 14, 2007 and Dec. 19, 2007) (including background information on Eluminati's various projects relating to Dome Theatres and Displays, Exhibitions and Installations, and Content and research, Eluminati's OmniFoucs Immersive Projection Systems (hardware and software), and Eluminati's services).

Immersive Environments & Display Systems by Pufferfish (http://www.pufferfishdisplays.co.uk/index.html), printed Dec. 14, 2007 and Dec. 19, 2007 (background information on the Puffersphere display system and The Puffer Immersive Mobile Sphere, explanations of video case studies, and press).

Science on a Sphere by the National Oceanic and Atmospheric Administration (http://sos.noaa.gov/), printed Dec. 14, 2007 and Dec. 19, 2007 (including background information, content creation information, training/user manuals, and a third party evaluation report prepared by The Maryland Science Center (www.mdsci.com)).

\* cited by examiner

METHOD AND SYSTEM FOR PRODUCING FULL MOTION MEDIA TO DISPLAY ON A SPHERICAL SURFACE

PRIORITY OF THE INVENTION

This application claims priority to U.S. Provisional Patent Application Ser. No. 60/854,856 filed Oct. 26, 2006, incorporated by reference herein in its entirety.

GOVERNMENT RIGHTS

The United States Government has acquired certain rights in this invention pursuant to Contract Nos. S-46952-Y and NNG-04-DA01-C-MOMS, both awarded by the NASA Goddard Space Flight Center.

FIELD OF THE INVENTION

The present invention relates generally to selecting and processing media for display on spherical surfaces, and more particularly to selecting and processing full motion media for display in a Science on a Sphere (SOS) platform.

BACKGROUND

In the field of media projection, display surfaces are traditionally flat. In turn, traditional media capture devices capture data in a rectilinear domain (i.e., formed or enclosed by straight, parallel lines), and traditional media display systems display the data on the flat surfaces as rectilinear frames. Recently, however, advancement in the art of media presentation technologies has resulted in new media display systems that are capable of depicting media on a fully spherical surface. An example of this type of system is Science on a Sphere (SOS), which was originally intended as a means to showcase planetary data in fully spherical representations. An SOS system may include a spherical display surface surrounded by a plurality of media projectors, each of which may be coupled to a display computer that drives the media projector. In turn, each display computer may be coupled to a central control computer, which may function to control the display computers. The SOS system may also include one or more user interfaces that allow users to interact with the SOS system. More detail about SOS may be found at http://SOS.noaa.gov, which is incorporated herein by reference.

Until now, the type of data available for display on spherical display systems (e.g., SOS) in a natural or logical manner has been limited. This is due in large part to the difficulties in producing data for natural/logical display in a spherical (i.e., curvilinear) domain as opposed to a rectilinear domain, especially when traditional media capture devices capture data in the rectilinear domain. Existing data for display on spherical display systems in a natural/logical manner includes data sets generated in a spherical domain for the specific purpose of displaying on a sphere. These data sets may be in the form of single frames (i.e., still images) or animations (i.e., logically successive images played back in rapid, sequential, and temporally consistent order). One example of a spherical data set is planetary data generated for the specific purpose of displaying on a sphere, as described above. Existing data for display on spherical display systems in a natural/logical manner also includes data generated and/or captured in the rectilinear domain that is tiled (i.e., multiple identical copies of the rectilinear image placed adjacently to one other so as to cover a spherical surface). In this respect, viewers located at different points along the spherical display surface may each see the same rectilinear data.

However, until now, rectilinear data has not been effectively produced for display on spherical surface as full motion media. In this respect, there are limited techniques and/or tools that currently exist for selecting subjects to be displayed as full motion media on a spherical surface. Further, there are limited techniques and/or tools that currently exist for processing full motion media captured in a rectilinear domain for display on a spherical surface. Accordingly, there is a need for improved techniques and/or tools that facilitate production of full motion media for display on a spherical surface.

SUMMARY

A method and system for producing full motion media for display on a spherical surface is described.

One aspect of the present invention may take the form of a method for producing full motion media for display on a spherical surface. The method may include (a) selecting a subject of full motion media for display on a spherical surface, (b) capturing the selected subject as full motion media in a rectilinear domain, and (c) processing the full motion media in the rectilinear domain for display on a spherical surface. Additionally, the method may also include preparing the selected subject for display on a spherical surface before capturing the selected subject as full motion media, providing the processed full motion media to a spherical projection system (e.g., a Science on a Sphere system), storing the processed full motion media, and/or simulating display of the full motion media in a spherical display system to validate processing of the full motion media.

In one example, selecting a subject of full motion media to display on a spherical surface may include selecting a subject with a spherical nature. In another example, selecting a subject of full motion media to display on a spherical surface may include selecting a subject with edges that can be rationally connected on a spherical display.

In yet another example, capturing the selected subject as full motion media may include capturing the selected subject as full motion media in a manner that invests in the selected subject a spherical nature. In still another example, capturing the selected subject as full motion media may include capturing the selected subject as full motion video. The full motion media may include a plurality of temporally contiguous data frames. In this respect, each of the data frames may then include a plurality of pixels. As a further example, the processed full motion media may include one instance of the captured subject per data frame of the full motion media. As still a further example, the processed full motion media may include frames that will completely cover the spherical surface.

As another example, processing the full motion media in the rectilinear domain for display on the spherical surface may include (i) altering data frames of the full motion media, (ii) orienting the full motion media for display on a spherical surface, (iii) processing edges of the captured full motion media, such that the edges appear seamless when displayed adjacently on a spherical surface, and/or (iv) adding rotation to the full motion media. In this respect, adding rotation to the full motion media may include selecting rotation parameters, selecting a portion of the full motion media in which to add rotation, and implementing the rotation parameters in the selected portion of the full motion media.

Another aspect of the present invention may take the form of a system for producing full motion media for display on a spherical surface. The system may include (a) a user interface, (b) a media capture device, (c) a processor, (d) data storage, and (e) program instructions stored in the data storage and executable by the processor to carry out various functions, including the functions described above.

These as well as other aspects and advantages will become apparent to those of ordinary skill in the art by reading the following detailed description, with reference where appropriate to the accompanying drawings. Further, it should be understood that the embodiments described in this summary and elsewhere are intended to be examples only and do not necessarily limit the scope of the invention.

DETAILED DESCRIPTION

Figure 1:
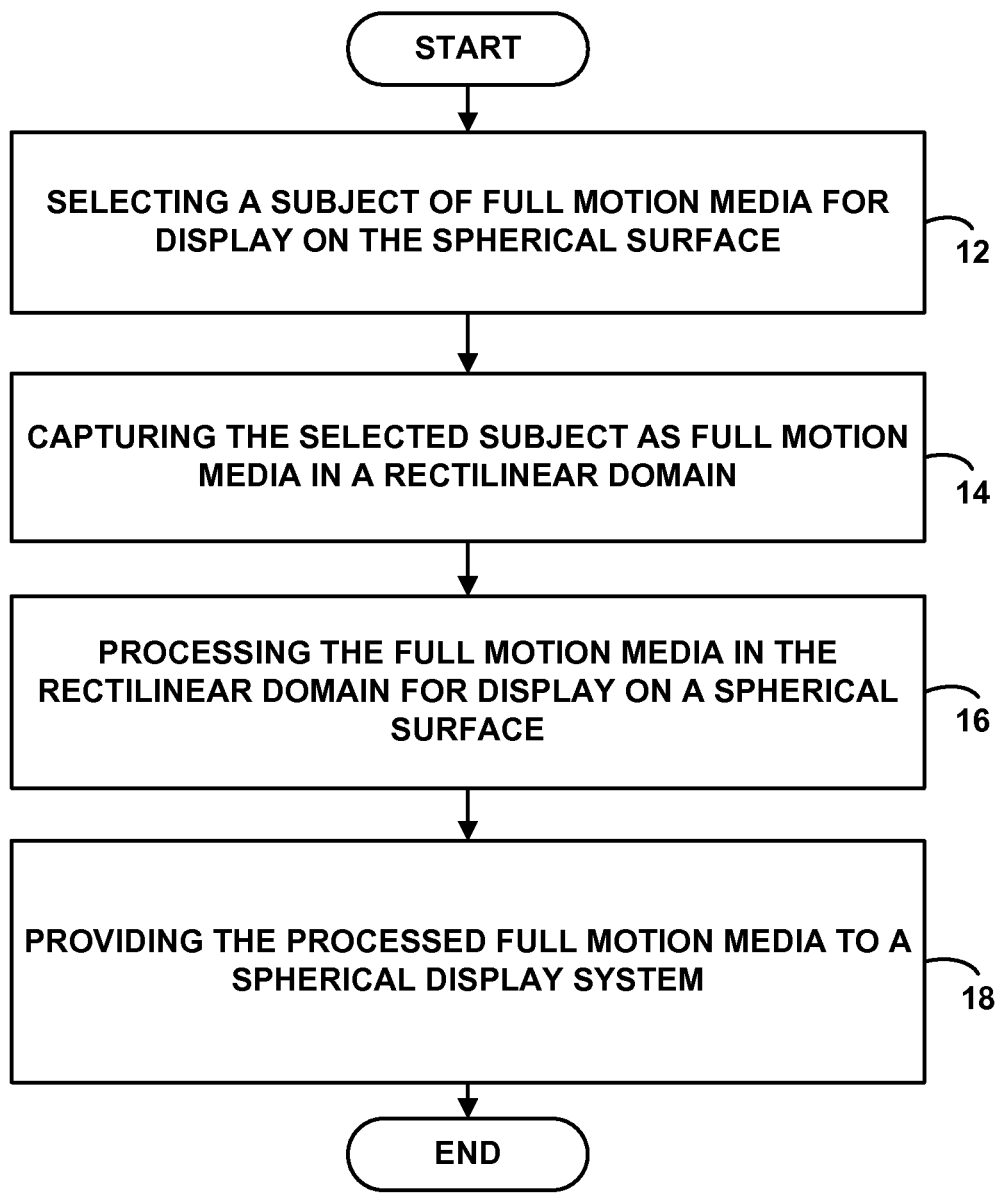
FIG. 1 is a method for producing full motion media for display on a spherical surface, according to an example of the present invention.

Referring to the drawings, FIG. 1 is a method for producing full motion media to display on a spherical surface, according to an example of the present invention. The method may begin at step 12 with selecting a subject of full motion media to display on the spherical surface. In this respect, the selected subject may be one or more physical objects existing in the real world, or the selected subjected may be one or more objects to be generated by a computer (e.g., via computer-generated imagery (CGI)). Further, the selection step may include selecting a single subject, or multiple subjects.

In one example, the selection step may include selecting a subject for the full motion media that has a spherical nature (i.e., a subject that will appear naturally or logically on a spherical surface). The subject may have a spherical nature if it is naturally spherical (e.g., an orange) or it has a continuous geometrical pattern. The subject may also have a spherical nature if, when displayed as media on a spherical surface, it presents relevant and related (but not identical) events on all viewable areas of the spherical surface (i.e. the subject will not cause any viewable area of the sphere to become irrelevant to the playing media). Further, the subject may have a spherical nature if it has temporal continuity. Further yet, the subject may have a spherical nature if it cannot be properly displayed on a flat surface. Other examples of subjects that have a spherical nature may exist as well Additionally, the selection step may include selecting a subject with edges, as defined by a media capture device (e.g., a digital camera and/or a computer), that can be rationally connected on a spherical surface. In this respect, when the subject is displayed as media on the spherical surface, the media may appear "seamless" to a viewer (i.e. there is no visible discontinuity in the media where the left edge of the subject intersects with the right edge of the subject on the sphere). Typically, a subject will have edges that can be rationally connected on a spherical surface if the edges have a similar character (e.g., the edges both depict a background of a scene that has a similar appearance).

Additionally yet, the selection step may also include other guidelines and/or rules for selecting the subject of the full motion media to be displayed on the spherical surface in a natural or logical manner. As an example, the selection step may include selecting a subject that includes void space to represent the non-existence of an object or an idea to a subset of viewers at any one time during display of the full motion media on the spherical surface.

After selecting the subject of the full motion media, the method may include preparing the selected subject for display on a spherical surface. In this respect, the preparation step may include positioning the subject to give it the properties discussed above in reference to the selection step.

At step 14, after selecting the subject of the full motion media, the method may include capturing the selected subject as full motion media in a rectilinear domain. In this respect, the selected subject may be captured as full motion video, CGI, and/or data visualization for instance. The capturing step may be facilitated by a video capture device (e.g., digital camcorder) and/or a computer with relevant media creation software.

In one preferred example, the selected subject will be captured as digital video. Digital video represents and stores subjects in a digital format as a three-dimensional array of data known as pixels. Two dimensions serve as spatial (i.e., horizontal and vertical) dimensions of the subject, and one dimension represents the time domain of the subject. A frame is a set of all pixels that correspond to a single point in time, and is basically equivalent to a still image. Captured digital video may also have a given resolution (i.e., pixels per frame) and frame rate (i.e., frames per second), which may depend on the capture setting of the video capture device.

In another example, the capturing step may include capturing the selected subject, and thus creating the full motion media, in a manner that invests in the selected subject a spherical nature. In this respect, the capturing step may include capturing the selected subject, and thus creating the full motion media, from one or more positions relative to the selected subject of the media such that it will display in a way that is naturally understandable on a spherical surface. For example, if the selected subject includes two people facing each other, the capturing step may include capturing the two people from any angle that prevents the two people from appearing both face-to-face and back-to-back when displayed on a spherical surface. Many other examples are possible as well.

In yet another example, if multiple subjects are selected for display on the spherical surface, the capturing step may include capturing the multiple subjects. In this respect, the capture step may be carried out by different devices at different time.

At step 16, after the selected subject is captured as full motion media, the method may include processing the full motion media for display on a spherical surface. In this respect, the processing step will preferably process the captured full motion media in the rectilinear domain such that each frame of the processed full motion media completely covers a spherical display. Further, the processing step will preferably process the captured full motion media such that each frame of the processed full motion media contains a single instance of the selected subject. In this respect, when dealing with a single selected subject, each frame may contain a single instance of the single selected subject, which may then completely cover the spherical surface. Alternatively, when dealing with multiple selected subjects, each frame may contain a single instance of each of the selected subject combined together, and this combination may then completely cover the spherical surface.

The processing step may include orienting the full motion media for display on a spherical surface, based on predetermined parameters and/or user input. For example, the processing step may orientate a position of the full motion media on the spherical surface. As another example, the processing step may orientate an axis, and corresponding angle, of the full motion media on the spherical surface. In either case, the processing step may orientate the full motion media by altering frame data of the full motion media, such as by remapping the frame data to new coordinates relative to a physical display screen. Further, in either case, the orientation of the full motion media may be time dependent.

The processing step may also include adding rotation (i.e., spin) to the full motion media for display on a spherical surface. In this respect, the processing step may first select rotation parameters, such as a rotation axis, a rotation direction, a rotation velocity, and/or a rotation spline. The processing step may also select a portion of the full motion media in which to add the rotation (e.g., in terms of frame and/or time identifiers). The above selections may be based on predetermined parameters, user input, and/or characteristics of the full motion media (e.g., frame rate). The processing step may then implement the rotation parameters in the selected portion of the full motion media. More particularly, the processing step may alter the data (e.g., offset the spatial dimensions of the frame data) of the selected portion of the full motion media to reflect the rotation parameters, such that the full motion media appears to rotate when displayed on a spherical display system.

The processing step may further include seam stitching procedures, which may function to edit edges of each source frame of the full motion media such that the edges appear to seamlessly connect when the frame is displayed on a spherical surface, thus resulting in viewers perceiving a continuous image on the spherical surface at all times during playback of the media. Further, the seam stitching procedures may also function to edit edges of the source frames of different full motion media, such that the different full motion media may be combined into a single full motion media in a seamless manner for display on a spherical surface. As one example, for CGI media, the seam stitching procedures may function to splice large strips of CGI media together in a seamless manner.

In addition to the functions described above, the processing step may also generally function to dress and contextualize the frames of the full motion media, such that the full motion media can be displayed on a spherical screen in a manner that is natural and/or logical for the spherical screen, and is thus aesthetically pleasing to viewers. Further, the processing step may also include other functions, such as the addition of text or audio to the full motion media. Other examples are possible as well.

At step 18, after processing the full motion media, the method may then include providing the full motion media to a spherical display system. In this respect, the method may include providing the full motion media to any spherical display system now known or later developed, including without limitation an SOS system and/or a Magic Planet system. In turn, the spherical display system may process the full motion media, such as by converting the full motion media from a rectilinear domain to a spherical domain and/or dividing the display tasks for the full motion media between multiple display computers/devices. The spherical display system may then display the full motion media on the spherical surface.

After processing the full motion media, the method may further include storing the processed full motion media. Further, after processing the full motion media, the method may include simulating the display of the full motion media in a spherical display system (e.g., SOS system) in order to validate the production of the full motion media. In this respect, if the simulating step indicates that the full motion media will not display properly on the spherical surface, the method may repeat the processing step before providing the full motion media to the spherical display system.

Figure 2:
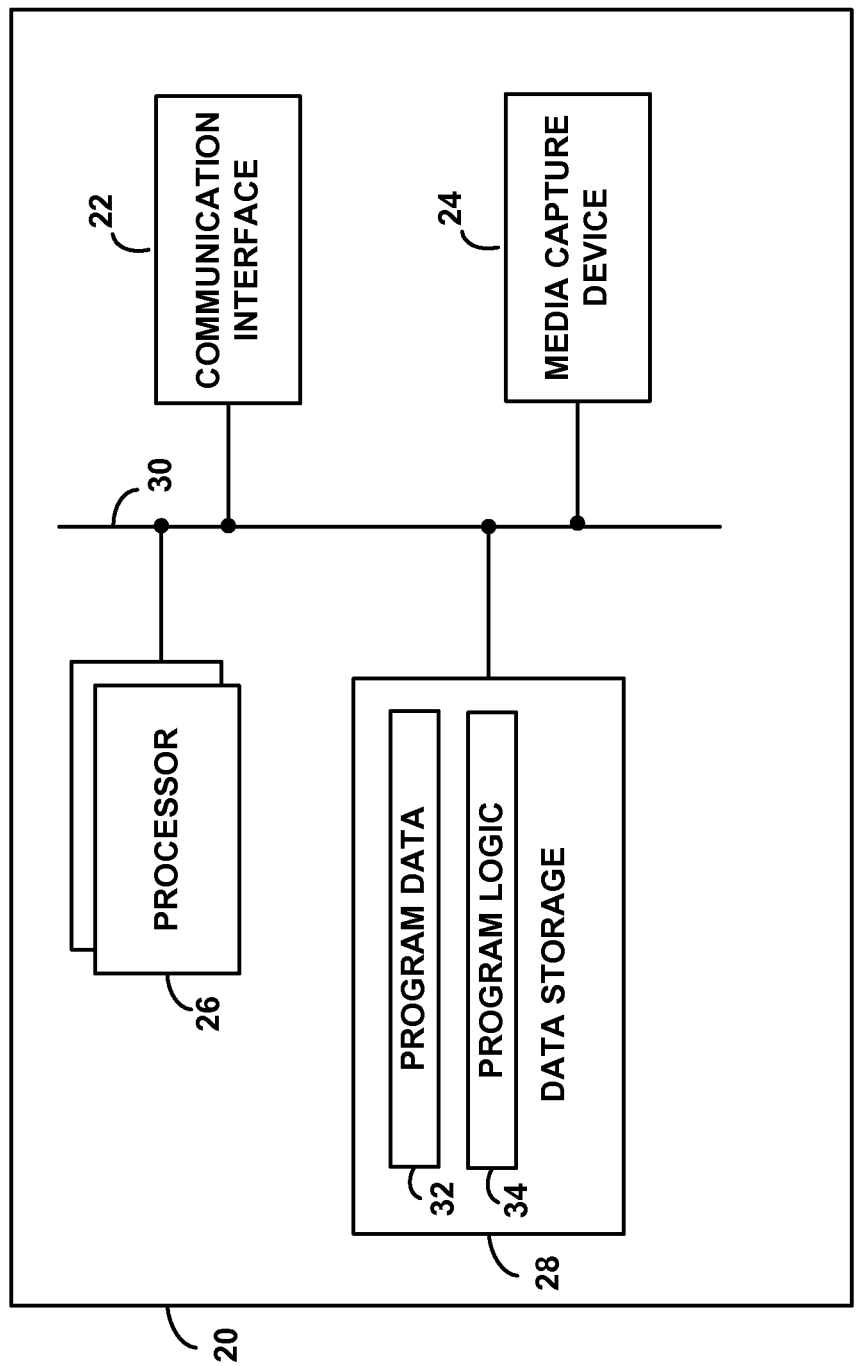
FIG. 2 is a simplified block diagram of an exemplary system for producing full motion media for display on a spherical surface, showing functional components that can operate to carry out functions of the present invention.

The method described above may be carried out by a variety of entities. FIG. 2 is a simplified block diagram of an exemplary system 20, showing functional components that can operate to carry out functions of the present invention. As shown, the exemplary system 20 may include a user interface 22, a media capture device 24, a processor 26, and data storage 28, all interconnected by a system bus or other connection mechanism 30.

The user interface 22 may function to facilitate user interaction, and specifically media creator input, with the system 20. The user interface 22 may include, for example, a visual interface, a manual interface, and/or a speech interface. The visual interface may include a display screen for providing a visual output to a user, such as visual output from the media capture device 24 and/or visual output regarding the processing step. Further, the manual interface may include various components for facilitating manual user input, such as a keyboard, multi-functional buttons, a navigation pad, and/or a scroll wheel for instance. Further yet, the speech interface may include a speaker for outputting audio signals to a user and a microphone for receiving speech commands from a user. The user interface 22 may also include signal processing components, such as A-D and D-A circuitry. The system 20 may also include multiple user interfaces 22, such as one user interface 22 for the media capture device 24 and one user interface 22 for the processor 26 and/or data storage 28.

The media capture device 24 may function to capture and record subjects as full motion media. As such, in a preferred example, the media capture device 24 may include at least a lens, an imager (e.g., a CCD or CMOS sensor), and a recorder. Preferably, the media capture device 24 will record captured media as digital photography and/or video in a rectilinear domain (e.g., individual/sequenced frames, MPEG-2, MPEG-4, etc.). The components and/or recording formats of the media capture device 24 may also define capture settings for the media capture device 24, such as resolution and/or frame rate. The system 20 may also include a plurality of media capture device 24, in which case each of the media capture devices 24 may capture and record a subject from a different position (e.g., angle) relative to the subject. An example of the media capture device 24 may be a digital camcorder. As another example, the media capture device 24 may be a computer that generates CGI. Other examples are possible as well.

The processor 26 may comprise one or more general purpose microprocessors and/or dedicated signal processors. (The term "processor" encompasses either a single processor or multiple processors that could work in combination.) Data storage 28, in turn, may comprise memory and/or other storage components, such as optical, magnetic, organic or other memory or disc storage, which can be volatile and/or nonvolatile, internal and/or external, and integrated in whole or in part with the processor 26. Data storage 28 preferably contains or is arranged to contain (i) program data 32 and (ii) program logic 34. Although these components are described herein as separate data storage elements, the elements could just as well be physically integrated together or distributed in various other ways. Preferably, the program data 32 will be maintained in data storage 28 separate from the program logic 34, for easy updating and reference by the program logic 34.

Program data 32 may contain information about selected subjects for the full motion media. Additionally, program data 32 may also contain captured and processed full motion media. Additionally yet, program data 32 may contain rules and/or parameters for selecting subjects and/or processing full motion media. In this respect, the rules and/or parameters may be predetermined, or may be based on user input received via the user interface 22. Other examples are possible as well.

Program logic 34 preferably comprises machine language instructions that may be executed or interpreted by processor 26 to carry out functions according to examples of the present invention, including the functions described with reference to FIG. 1. It should be understood, however, that the program logic 34 and its associated functions are described herein by way of example only. As such, those skilled in the art will appreciate that other program logic and/or functions may be used instead, some program logic and/or functions may be added, and some program logic and/or functions may be omitted altogether. Further, the various functions described herein can be embodied in software, hardware, and/or firmware.

For example, the program logic 34 may be executable by the processor 26 to (a) select a subject of media to display on a spherical surface, based on input provided via the user interface 22, (b) capture the selected subject as full motion media in a rectilinear domain, based on input provided via the user interface 22, (c) process the full motion media for display on a spherical surface; and (d) provide the processed full motion media to a spherical projection system. As another example, the program logic 34 may be executable by the processor 26 to store the processed full motion media and/or simulate the display of the full motion media in a spherical display system. Other examples are possible as well.

Figure 3:
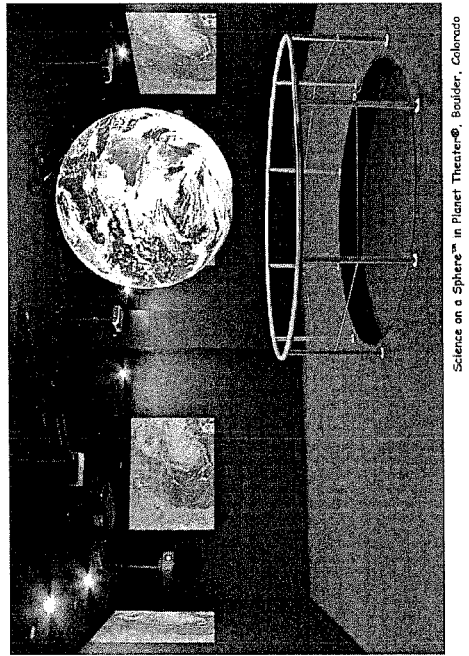
FIG. 3 depicts a layout of a Science on a Sphere system in which full motion media produced according to the present invention may be implemented.
Figure 3:
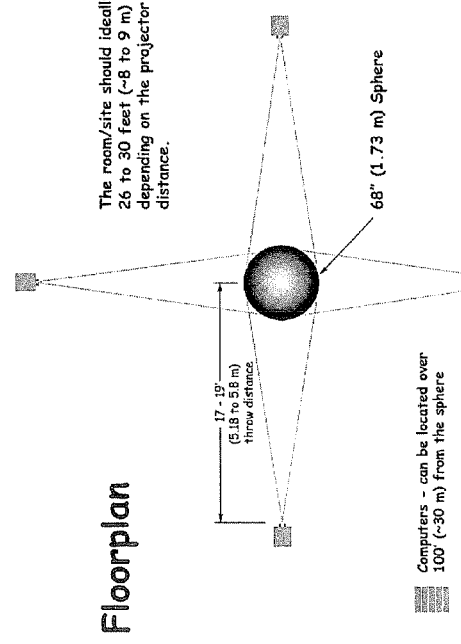
Figure 3:
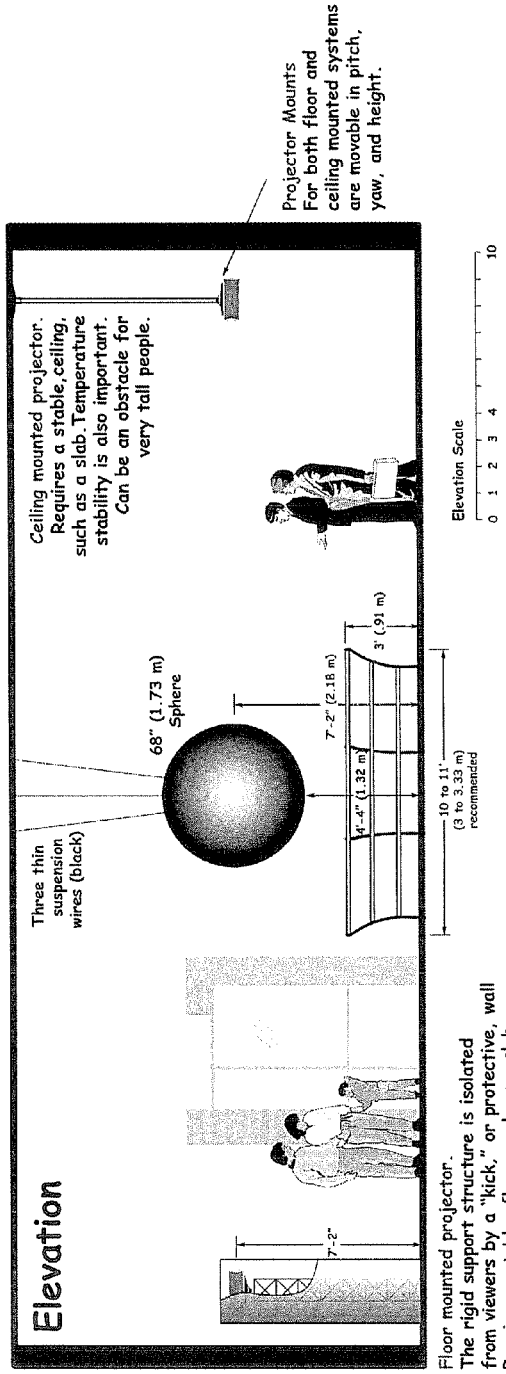

FIG. 3 depicts a layout of an SOS system in which full motion media produced according to the present invention may be displayed. As shown, the SOS system may include a sphere suspended from a ceiling and surrounded by a plurality of projectors. The projectors may be mounted to the floor and/or the ceiling. In a preferred example, there will be four projectors located at right angles to one other.

Advantageously, the present invention provides production techniques and technologies that did not previously exist in the art of spherical media projection. For example, the present invention provides users with rules for selecting subjects for natural display on a spherical surface. As another example, the present invention provides users with the ability to process (e.g., position, move, add rotation, etc.) and save full motion media in a rectilinear domain before displaying the full motion media on the spherical surface, with dramatic levels of control. In turn, the present invention may facilitate the seamless playback of full-motion video on a spherical surface in any spherical display system now known or later developed, thus providing viewers of the spherical display system with a more aesthetically pleasing spherical viewing experience.

Exemplary embodiments of the present invention have been described above. Those skilled in the art will understand, however, that changes and modifications may be made to the embodiments described without departing from the true scope and spirit of the present invention, which is defined by the claims.

I claim:

1. A method comprising:
    capturing a selected subject as full motion media in a rectilinear domain, the full motion media comprising a first frame;
    processing the full motion media in the rectilinear domain for display on a spherical surface of a spherical projection system, wherein processing the full motion media in the rectilinear domain for display on the spherical surface comprises generating a second frame of the full motion media by at least remapping rectilinear data of the first frame of the full motion media to new coordinates relative to the spherical surface, the second frame being configured to substantially completely cover the spherical surface;
    simulating display of the full motion media in a spherical display system to validate processing of the full motion media; and
    displaying, via the spherical projection system, the processed full motion media on the spherical surface.

* * * * *